Figure 1:
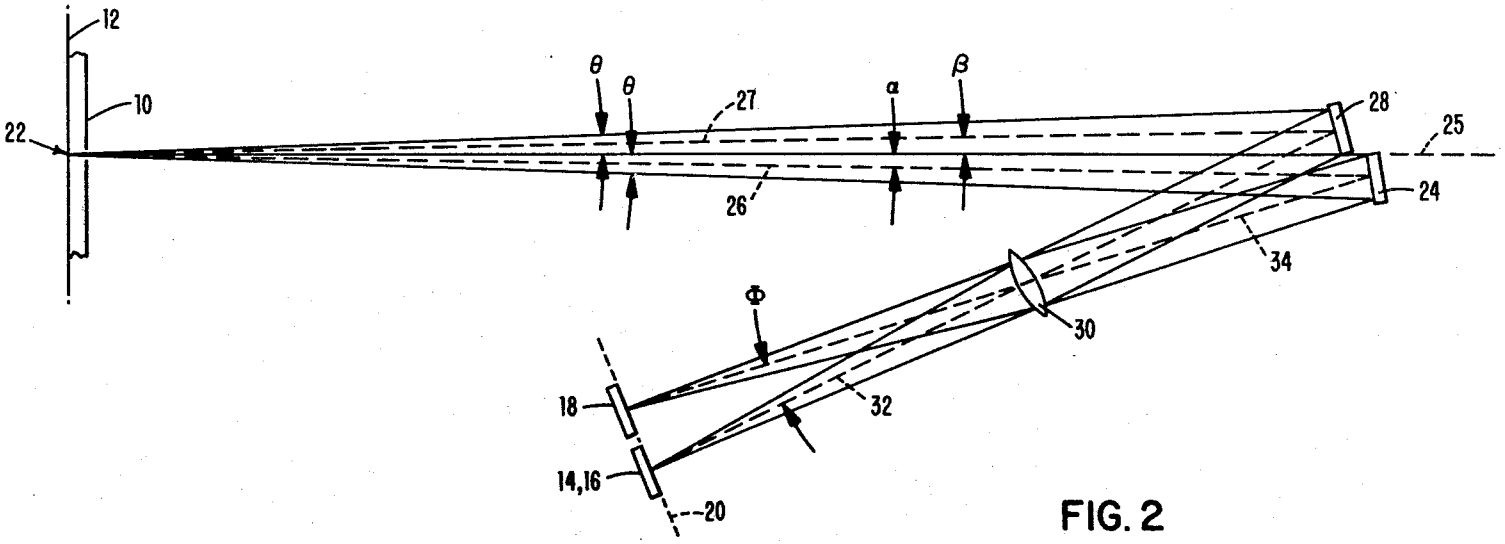
Figure 2:
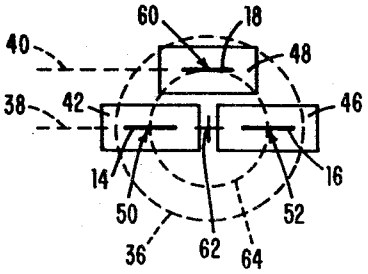
Figure 3:
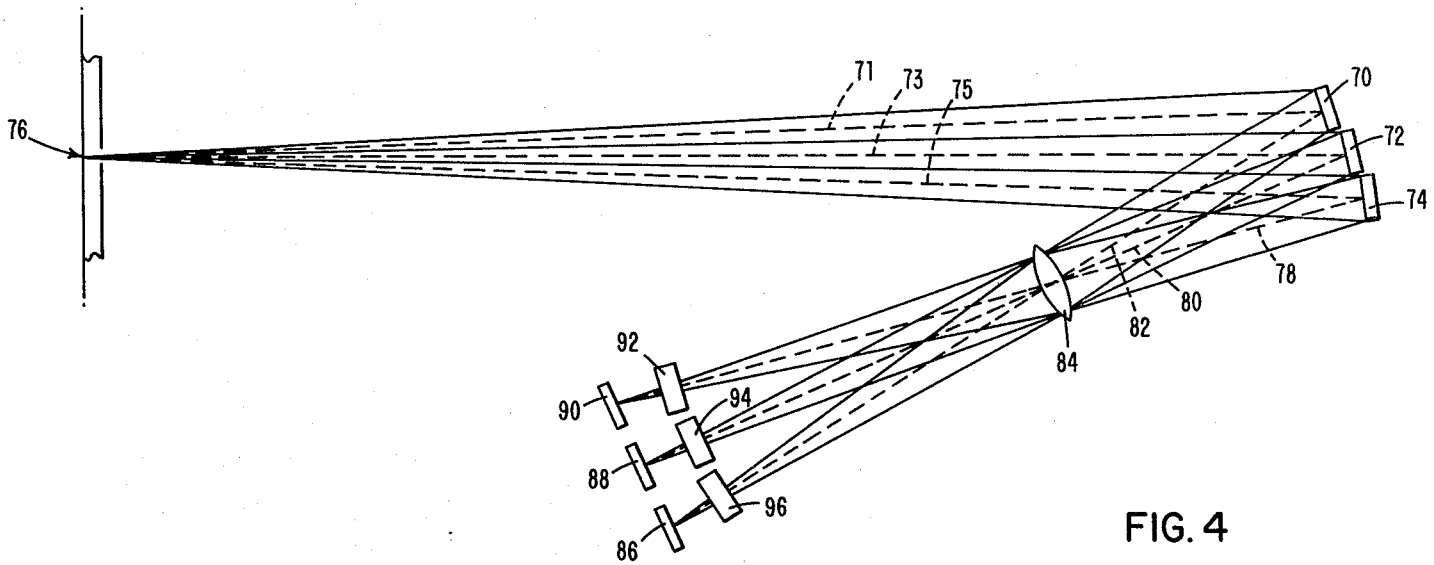
Figure 4:
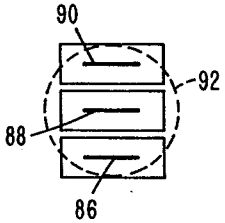

United States Defensive Publication [19] (H) [11] T103,801

Grant et al. [43] Jan. 3, 1984

[54] MIRROR MULTIPLEXOR FOR LINEAR IMAGE SENSORS

[76] Inventors: Duane E. Grant, 445 S. 68th St., Boulder, Colo. 80303; Randall A. Maddox, 416 Woodview Dr., Lexington, Ky. 40509

[21] Appl. No.: 410,723

[22] Filed: Aug. 23, 1982

Related U.S. Application Data

[63] Continuation of Ser. No. 152,442, May 22, 1980, abandoned.

[51] Int. Cl.[3] ..... H01J 40/14

[52] U.S. Cl. ..... 250/578

[57] ABSTRACT

An optical apparatus and method for multiplexing (that is splitting) an optical ray or rays emanating from a line object disposed at the platen of a scanner. The procedure enables multiple images of a line object to be formed at the image plane. The apparatus includes a plurality of fixed and movable mirrors disposed to fold the rays along separate optical axis through a common lens onto a plurality of linear photosensitive arrays. The arrays are disposed at the image plane of the scanner. The arrays are configured with the centers of each array being disposed symmetrical with respect to the principal axis of the lens.

In one embodiment a plurality of optical filters are disposed so that each filter intercepts one of the optical axis exiting from the lens. The rays which are associated with each axis pass through the filters onto the linear photosensitive arrays. The configuration is ideally suited for use in a single pass color scanner.

14 Claims, 2 Sheets Drawing,

20 Pages Specification

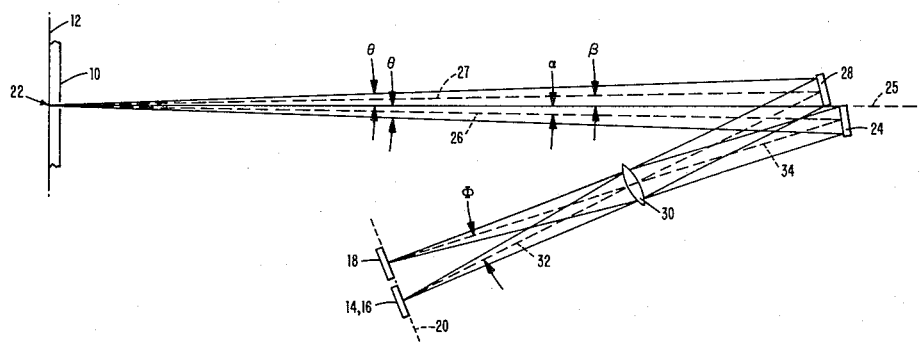

The file of this unexamined application may be inspected and copies thereof may be purchased (849 O.G. 1221, Apr. 9, 1968).